(12) United States Patent
Wood et al.

(10) Patent No.: US 8,045,187 B2
(45) Date of Patent: Oct. 25, 2011

(54) VARIABLE DATA PRINTING WITHIN A PRINT DRIVER

(75) Inventors: Loren Wood, Lakewood, CA (US); Rick Yardumian, Orange, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 1364 days.

(21) Appl. No.: 11/606,576

(22) Filed: Nov. 30, 2006

(65) Prior Publication Data
US 2008/0130036 A1 Jun. 5, 2008

(51) Int. Cl.
G06F 3/12 (2006.01)
G06F 3/00 (2006.01)
G06K 15/00 (2006.01)
H04N 1/387 (2006.01)

(52) U.S. Cl. ...... 358/1.13; 358/1.16; 358/452; 715/222; 715/223; 715/224; 715/225

(58) Field of Classification Search ............... 358/1.13, 358/1.16, 452; 715/222, 223, 224, 225
See application file for complete search history.

(56) References Cited

U.S. PATENT DOCUMENTS

| | | | |
|---|---|---|---|
| 6,732,152 B2 * | 5/2004 | Lockhart et al. | 709/206 |
| 6,862,708 B1 * | 3/2005 | Higginbotham et al. | 715/201 |
| 7,025,268 B2 | 4/2006 | Alleshouse | 235/462.01 |
| 2003/0058469 A1 | 3/2003 | Buis et al. | 358/1.15 |
| 2004/0094632 A1 * | 5/2004 | Alleshouse | 235/494 |
| 2005/0261862 A1 * | 11/2005 | Ternasky et al. | 702/122 |
| 2006/0248454 A1 * | 11/2006 | Giannetti | 715/517 |
| 2007/0180359 A1 * | 8/2007 | Giannetti | 715/513 |

OTHER PUBLICATIONS

A PPML/T Based Variable Data Printing Engine, International Conference on Digital Printing Technologies, Gimenez, G. Chiarabini, L., Nov. 2004, Edition 20, pp. 347-350.*
"Microsoft XPS Specification and Reference Guide", Dec. 2005, Version 0.8, 393 pages.*
U.S. Appl. No. 09/661,029 (Carcerano, et al.).

* cited by examiner

*Primary Examiner* — Thomas Lett
(74) *Attorney, Agent, or Firm* — Fitzpatrick, Cella, Harper & Scinto

(57) ABSTRACT

The present invention provides for variable data printing by a print driver. Static print data is received, wherein the static print data is in a page description language. Variable print data is also received, wherein the variable print data comprises one or more sets of variable data. In addition, mapping rule data is received, wherein the mapping rule data comprises rules for mapping the one or more sets of variable data into the static print data. One or more modified versions of the static print data are generated, by applying the rules for mapping the one or more sets of variable data into the static print data. The one or more modified versions of the static print data are output for printing. As such, virtually any application can have VDP functionality, and a less complex VDP solution can be realized.

19 Claims, 4 Drawing Sheets

VARIABLE DATA PRINTING WITHIN A PRINT DRIVER

BACKGROUND OF THE INVENTION

1. Field of the Invention

The invention relates to the field of print drivers, and more particularly relates to variable data printing within a print driver.

2. Description of the Related Art

Variable Data Printing (VDP) is used for print jobs with unique printed data, such as a name and address, account information or custom text or images. VDP is typically used to print multiple copies of a print job, where each copy has some content that varies from other copies.

The complexity of VDP systems often varies, depending on the type of print job to be performed. For example, VDP can be used for simple applications like mail merge, in which different mailing addresses are printed for each copy. VDP can also be used for more complex targeted marketing systems. For example, when sending automobile brochures to customers, VDP can be used to personalize brochures based on a customer's age, marital status, yearly income, etc. In one instance, if a customer is married, the brochure can show pictures of minivans. In another instance, if a customer is single and wealthy, expensive sports cars can be shown.

Conventional VDP solutions typically reside upstream from the printing system. However, such VDP solutions often use proprietary software, which can be expensive and resource-intensive.

SUMMARY OF THE INVENTION

In view of the foregoing problems, the present invention provides for variable data printing by a print driver, in which static print data, variable print data, and mapping rule data are received. One or more modified versions of the static print data are generated by mapping the variable print data into the static print data using the mapping rule data, and the one or more modified versions of the static print data are output for printing. As such, virtually any application can have VDP functionality, and a less complex VDP solution can be realized.

According to one aspect of the invention, variable data printing by a print driver is provided. Static print data is received, wherein the static print data is in a page description language. Variable print data is also received, wherein the variable print data comprises one or more sets of variable data. In addition, mapping rule data is received, wherein the mapping rule data comprises rules for mapping the one or more sets of variable data into the static print data. One or more modified versions of the static print data are generated, by applying the rules for mapping the one or more sets of variable data into the static print data. The one or more modified versions of the static print data are output for printing.

The print driver can be an XML Paper Specification (XPS) print driver, and the static print data can be a static XPS data stream. The variable print data and the mapping rule data can be defined by preferences of the print driver. The static print data can be received from an application which is separate from the print driver.

The print driver can comprise an XPS driver filter which handles the generating and the outputting of the one or more modified versions of the static print data. The XPS print driver can use XML processing techniques to modify the static XPS data stream.

The one or more sets of variable data can correspond to comma-separated database records stored in a file external to the print driver. Alternatively, the one or more sets of variable data can be acquired at run-time from database commands.

The mapping rule data can use keyword substitution for mapping the one or more sets of variable data into the static print data. Alternatively, the mapping rule data can use XML Stylesheet Language for Transformations (XSLT) for mapping the one or more sets of variable data into the static XPS data stream.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE INVENTION

Figure 1:
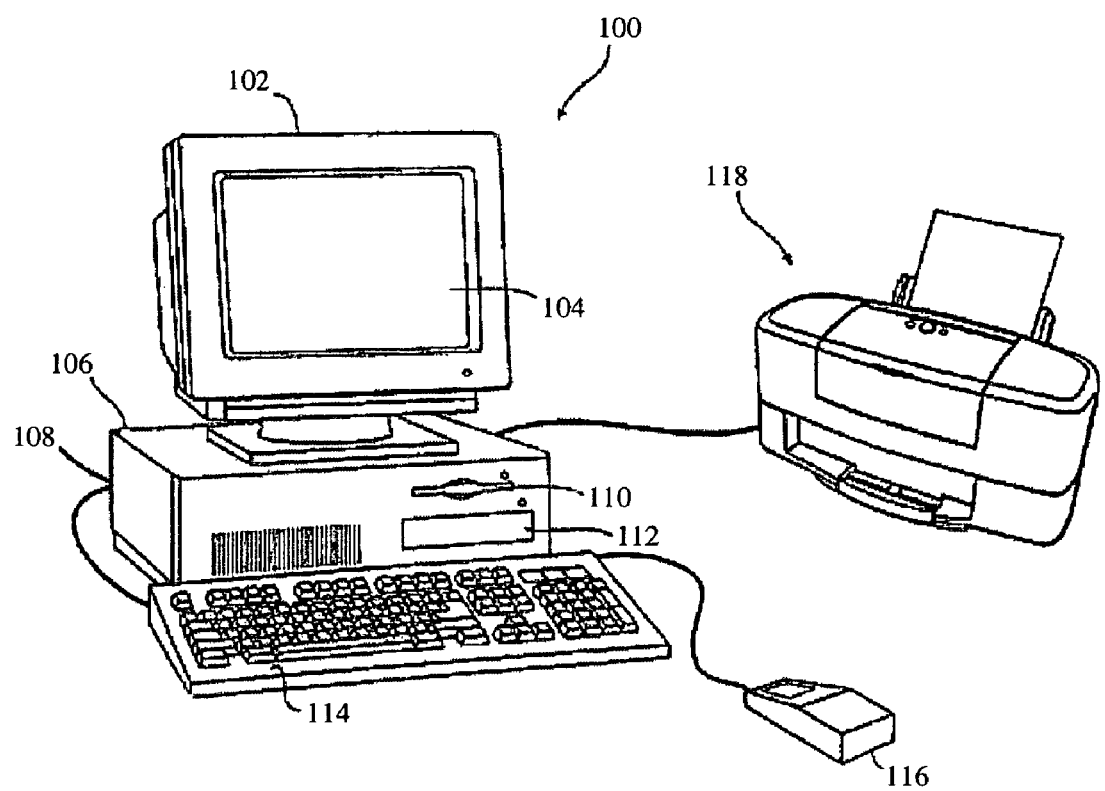
FIG. 1 is a representative view of a computer system in which the present invention may be implemented.

Referring to FIG. 1, a representative view of the outward appearance of a representative computing system including computing equipment, peripherals and digital devices which may be used in connection with the practice of the present invention is shown. Specifically, FIG. 1 depicts computing equipment 100, which includes host processor 106 comprising a personal computer (hereinafter "PC"). Provided with computing equipment 100 are monitor 102 including display screen 104 for displaying text and images to a user, keyboard 114 for entering text data and user commands into PC 106, and pointing device 116. Pointing device 116 preferably comprises a mouse, for pointing, selecting and manipulating objects displayed on display screen 104.

Computing equipment 100 includes a computer readable memory medium such as computer fixed disk 112 and/or removable memory media drive 110. Removable memory media drive 110 provides a means whereby computing equipment 100 can access information, computer-executable process steps, application programs, etc. stored on removable memory media.

Also included is printer 118, which forms printouts on a recording medium such as paper or transparencies or the like. Printer 118 receives data for printing from PC 106.

Figure 2:
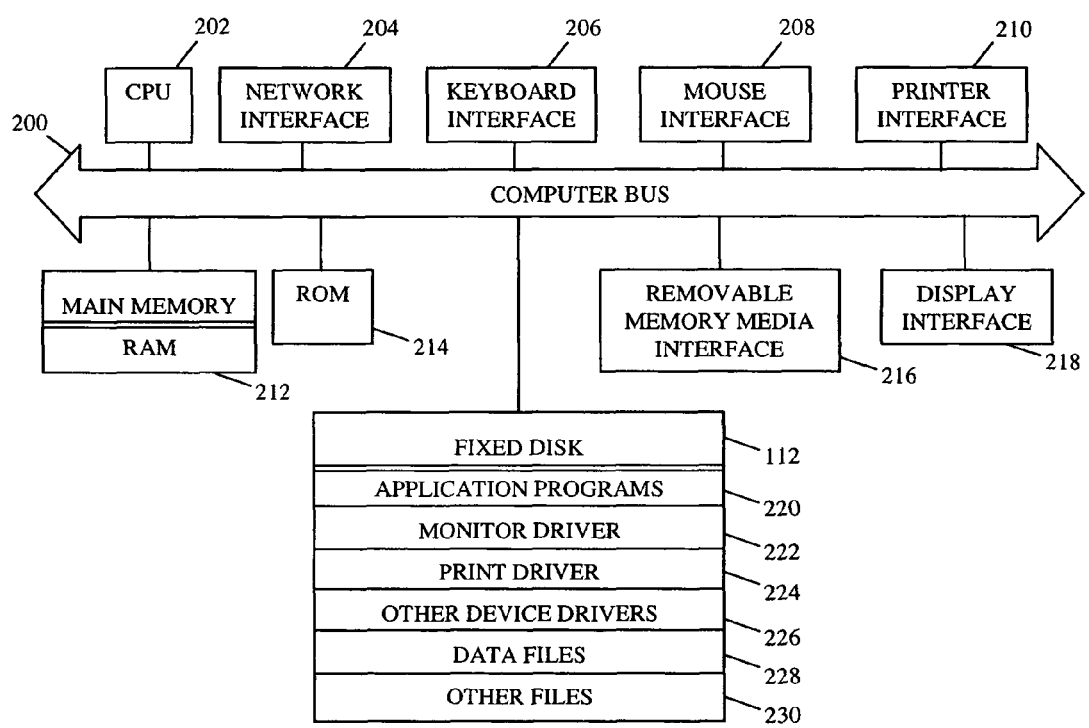
FIG. 2 is a block diagram depicting an example of an internal architecture of the FIG. 1 embodiment.

FIG. 2 is a block diagram illustrating the internal architecture of the FIG. 1 embodiment. As shown in FIG. 2, PC 106 includes network interface 204 for network access 108, and central processing unit ("CPU") 202, that interfaces with computer bus 200. Also interfacing with computer bus 200 are fixed disk 112, random access memory ("RAM") 212 for use as main memory, read only memory ("ROM") 214, removable memory media interface 216 to allow PC 106 to interface with removable memory media drive 110, display interface 218 for interfacing with monitor 102, keyboard interface 206 for interfacing with keyboard 114, mouse interface 208 for interfacing with pointing device 116, and printer interface 210 for interfacing with printer 118.

Main memory 212 interfaces with computer bus 200 so as to provide quick RAM storage to CPU 202 during execution of software programs such as the operating system application programs, and device drivers. More specifically, CPU 202 loads computer-executable process steps from fixed disk 112 or other memory media into a region of main memory 212 in order to execute software programs. Data such as print data can be stored in main memory 212, where the data can be accessed by CPU 202 during execution.

Read only memory (ROM) 214 stores invariant computer-executable program code, or program or process steps, for basic system functions such as basic input and output (I/O), startup, or reception of keystrokes from keyboard 114.

As also shown in FIG. 2, fixed disk 112 stores computer-executable code for application programs 220, monitor driver 222, print driver 224, other device drivers 226, data files 228 and other files 230.

Print driver 224 is software that converts data to be printed to a form specific to printer 118. In this representative embodiment, print driver 224 is configured to perform variable data printing.

FIGS. 1 and 2 illustrate one example of a computing system that executes program code, or program or process steps, configured to perform variable data printing. However, it should be noted that other types of computing systems may also be used.

Figure 3:
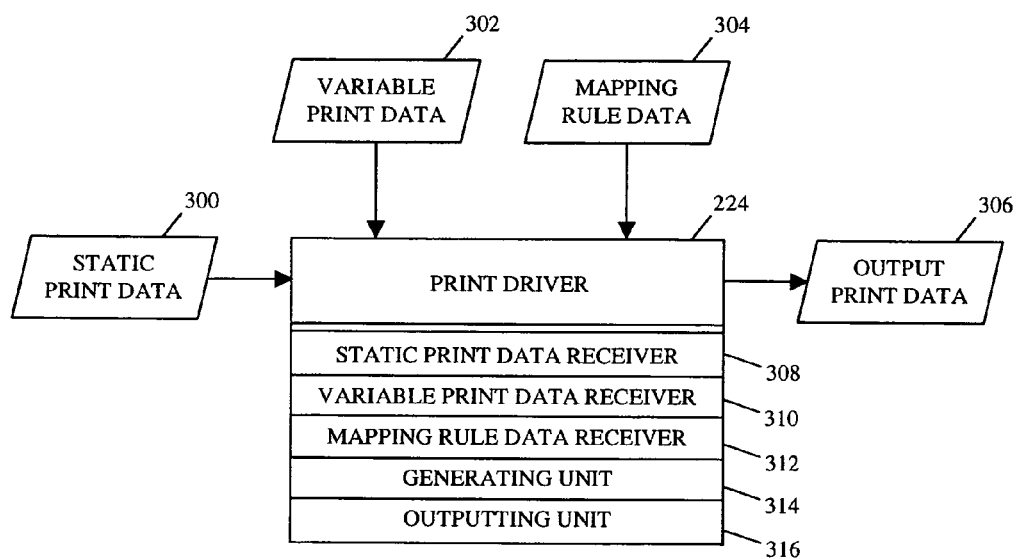
FIG. 3 is a block diagram depicting a print driver which can perform variable data printing according to a representative embodiment of the invention.

FIG. 3 is a block diagram depicting a print driver 224 which can perform variable data printing. In one representative embodiment, print driver 224 is an XML Paper Specification (XPS) print driver. Print driver 224 includes a static print data receiver 308, a variable print data receiver 310 and a mapping rule data receiver 312, which respectively receive static print data 300, variable print data 302 and mapping rule data 304 as input. Variable print data 302 includes one or more sets of variable data, and mapping rule data 304 includes rules for mapping the one or more sets of variable data into static print data 300.

Print driver 224 also includes a generating unit 314 for generating print data based on the received static print data 300, variable print data 302 and mapping rule data 304. For each of the one or more sets of variable data n, generating unit 314 generates n modified copies of static print data 224, by inserting the variable data as defined by mapping rule data 304. In general, there is a different set of variable data for each modified copy of the static print data.

In addition, print driver 224 includes an outputting unit 316 for outputting the generated print data. More specifically, output unit 316 outputs the n modified copies of the static print data, as output print data 306 for printing.

In this regard, it should be noted that generating unit 314 and outputting unit 316 can be included within a driver filter (not shown), where the driver filter generates and outputs the n modified copies of the static print data.

Figure 4:
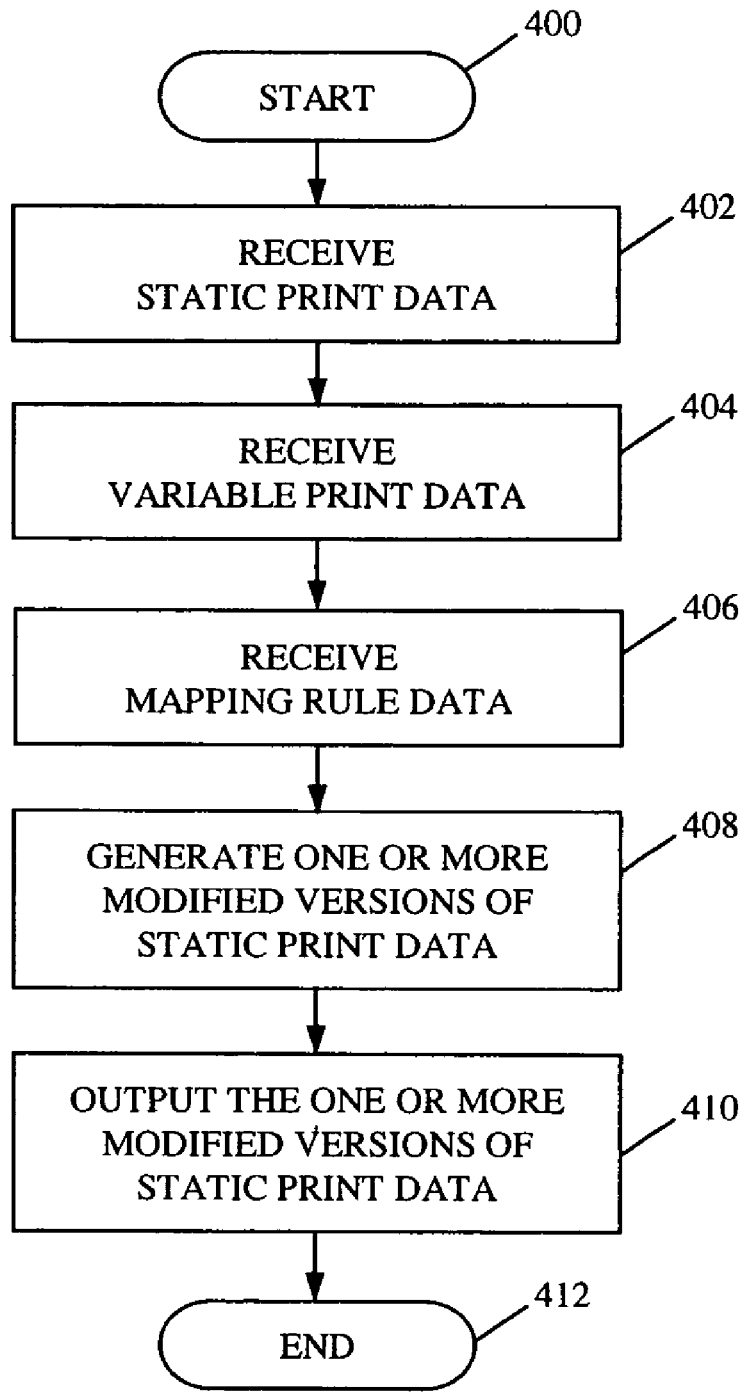
FIG. 4 is a flowchart illustrating variable data printing according to a representative embodiment of the present invention.

FIG. 4 is a flowchart illustrating variable data printing by a print driver according to a representative embodiment of the present invention. Following start bubble 400, static print data is received by a print driver (block 402). Static print data is typically received from an application which is separate from the print driver. In addition, the static print data is in a page description language. For example, in a case where the print driver is an XPS print driver, the static print data is a static XPS print stream, which is defined by Microsoft's® XPS specification.

In addition, variable print data and mapping rule data are received by the print driver (blocks 404 and 406, respectively). The variable print data and mapping rule data are typically defined by preferences of the print driver. The variable print data includes one or more sets of variable data, and the mapping rule data includes rules for mapping the one or more sets of variable data into the static print data.

There are various ways to describe the variable print data and mapping rule data. Regarding the variable data, the one or more sets of variable data can correspond to comma-separated database records stored in a file external to the print driver. Alternatively, the one or more sets of variable data can be acquired at run-time from database commands.

With reference to the mapping rule data, this data can use keyword substitution for mapping the one or more sets of variable data into the static print data. For example, specific keywords can be searched for in the static print data, and variable data content can be substituted in for those keywords.

In a case where the print driver is an XPS print driver, the mapping rule data can use XML Stylesheet Language for Transformations (XSLT) for mapping the one or more sets of variable data into the static XPS print stream. This can allow for more complex transformations of the static print data. Standard XML processing techniques can also be used to modify the static XPS print stream.

Next, one or more modified versions of the static print data are generated (block 408). In other words, for each of the one or more sets of variable data n, n modified copies of static print data are generated, by inserting the variable data as defined by the mapping rules. In general, there is a different set of variable data for each modified copy of the static print data.

The one or more modified versions of the static print data are then output (block 410). More specifically, the generated n modified copies of the static print data are output for printing. As noted above, the print driver may comprise a driver filter which handles the generating (block 408) and the outputting (410) of the one or more modified versions of the static print data. Following the outputting of print data, the process ends (end bubble 412).

Accordingly, the present invention is seen to provide for variable data printing within a print driver. The present invention is seen to allow virtually any application to have VDP functionality, by providing a generic method for adding VDP functionality to virtually any application (such as a Windows application). Furthermore, a less complex VDP solution is seen to be realized.

The invention has been described above with respect to particular illustrative embodiments. It is understood that the invention is not limited to the above-described embodiments and that various changes and modifications may be made by those skilled in the relevant art without departing from the spirit and scope of the invention.

What is claimed is:

1. A method for variable data printing by a print driver, comprising the steps of:

receiving static print data in a page description language from an application which is separate from the print driver;

receiving variable print data, wherein the variable print data comprises one or more sets of variable data;

receiving mapping rule data, wherein the mapping rule data comprises rules for mapping the one or more sets of variable data into the static print data;

generating one or more modified versions of the static print data in which the variable print data is inserted within the printer driver, by applying the rules for mapping the one or more sets of variable data into the static print data; and outputting the one or more modified versions of the static print data in which the variable print data is inserted for printing to a printer.

2. A method according to claim 1, wherein the print driver is an XML Paper Specification (XPS) print driver, and wherein the static print data is a static XPS data stream.

3. A method according to claim 2, wherein the print driver comprises an XPS driver filter which handles the generating and the outputting of the one or more modified versions of the static print data.

4. A method according to claim 3, wherein the XPS print driver uses XML processing techniques to modify the static XPS data stream.

5. A method according to claim 1, wherein the variable print data and the mapping rule data are defined by preferences of the print driver.

6. A method according to claim 2, wherein the mapping rule data uses XML Stylesheet Language for Transformations (XSLT) for mapping the one or more sets of variable data into the static XPS data stream.

7. A method according to claim 1, wherein the one or more sets of variable data correspond to comma-separated database records stored in a file external to the print driver.

8. A method according to claim 1, wherein the one or more sets of variable data are acquired at run-time from database commands.

9. A method according to claim 1, wherein the mapping rule data uses keyword substitution for mapping the one or more sets of variable data into the static print data.

10. A data processing apparatus having a CPU and a memory storing a print driver for variable data printing, comprising:
   a static print data receiver configured to receive static print data in a page description language from an application which is separate from the print driver;
   a variable print data receiver configured to receive variable print data, wherein the variable print data comprises one or more sets of variable data;
   a mapping rule data receiver configured to receive mapping rule data, wherein the mapping rule data comprises rules for mapping the one or more sets of variable data into the static print data;
   a generating unit configured to generate one or more modified versions of the static print data in which the variable print data is inserted within the printer driver, by applying the rules for mapping the one or more sets of variable data into the static print data; and
   an output unit configured to output the one or more modified versions of the static print data in which the variable print is inserted for printing to a printer.

11. A data processing apparatus according to claim 10, wherein the print driver is an XML Paper Specification (XPS) print driver, and wherein the static print data is a static XPS data stream.

12. A data processing apparatus according to claim 11, wherein the printer driver comprises an XPS driver filter, and wherein the XPS driver filter comprises the generating unit and the output unit.

13. A data processing apparatus according to claim 12, wherein the XPS print driver uses XML processing techniques to modify the static XPS data stream.

14. A data processing apparatus according to claim 11, wherein the mapping rule data uses XML Stylesheet Language for Transformations (XSLT) for mapping the one or more sets of variable data into the static XPS data stream.

15. A data processing apparatus according to claim 10, wherein the variable print data and the mapping rule data are defined by preferences of the print driver.

16. A data processing apparatus according to claim 10, wherein the one or more sets of variable data correspond to comma-separated database records stored in a file external to the print driver.

17. A data processing apparatus according to claim 10, wherein the one or more sets of variable data are acquired at run-time from database commands.

18. A data processing apparatus according to claim 10, wherein the mapping rule data uses keyword substitution for mapping the one or more sets of variable data into the static print data.

19. A computer-readable storage medium storing a computer-executable program for variable data printing by a print driver, the program comprising code for:
   receiving static print data in a page description language from an application which is separate from the print driver;
   receiving variable print data, wherein the variable print data comprises one or more sets of variable data;
   receiving mapping rule data, wherein the mapping rule data comprises rules for mapping the one or more sets of variable data into the static print data;
   generating one or more modified versions of the static print data in which the variable print data is inserted within the printer driver, by applying the rules for mapping the one or more sets of variable data into the static print data; and
   outputting the one or more modified versions of the static print data in which the variable print data is inserted for printing to a printer.

* * * * *